United States Patent
Syversen et al.

[11] Patent Number: 6,099,703
[45] Date of Patent: Aug. 8, 2000

[54] WATER PURIFICATION PLANT

[75] Inventors: Ulf Syversen, Fredrikstad, Norway; Jan Sundell, Arvika, Sweden; Ingunn Saur Synnove Rubach, both of Fredrikstad, Norway; Gudolf Kjaerheim, Fredrikstad, Norway

[73] Assignee: Cleaner Technology AS, Fredrikstad, Germany

[21] Appl. No.: 09/077,946

[22] PCT Filed: Dec. 6, 1996

[86] PCT No.: PCT/NO96/00285

§ 371 Date: Sep. 11, 1998

§ 102(e) Date: Sep. 11, 1998

[87] PCT Pub. No.: WO97/20777

PCT Pub. Date: Jun. 12, 1997

[30] Foreign Application Priority Data

Dec. 7, 1995 [NO] Norway ..................................... 954966

[51] Int. Cl.⁷ ................................. C25B 9/00; C25B 15/00
[52] U.S. Cl. .......................... 204/232; 204/237; 204/273; 204/269
[58] Field of Search .................................. 204/273, 237, 204/275, 232, 269

[56] References Cited

U.S. PATENT DOCUMENTS

| | | |
|---|---|---|
| 3,505,188 | 4/1970 | Pan ...................................... 204/232 X |
| 3,684,703 | 8/1972 | Marmo ................................ 204/232 X |
| 3,905,890 | 9/1975 | Minegishi ............................ 204/273 X |
| 3,944,478 | 3/1976 | Kuji et al. ................................ 204/275 |
| 3,964,991 | 6/1976 | Sullins .................................... 204/273 |
| 4,236,990 | 12/1980 | King ........................................ 204/275 |
| 4,770,755 | 9/1988 | Valanti et al. ....................... 204/269 X |
| 5,022,974 | 6/1991 | Haivala ................................... 204/275 |
| 5,352,343 | 10/1994 | Bailes et al. ............................. 204/149 |

FOREIGN PATENT DOCUMENTS

| | | |
|---|---|---|
| 0 108 326 A1 | 10/1983 | European Pat. Off. . |
| 0 623 558 A1 | 4/1994 | European Pat. Off. . |
| PCT/SE93/01074 | 7/1994 | WIPO . |
| PCT/SE93/01097 | 7/1994 | WIPO . |

*Primary Examiner*—Donald R. Valentine
*Attorney, Agent, or Firm*—Duane, Morris & Heckscher, LLP

[57] ABSTRACT

Water cleaning device with at least one reactor device (4) for electrolytic cleaning of polluted water, assembled of one or more anodes (1a) and cathodes (2a), one flotation device (14, 15) and one device for handling sludge (23, 24, 18). The water flow inside and just outside (downstream) of the electrochemical reactor (4) is turbulent. The turbulence is created by one or more mechanical devices which affect the flow pattern. Examples of such mechanical devices may be a corrugated or rough, an exchangeable inlay plate (5) on the cathode surface, an inert, non-conducting rotating or stationary piece (20) in the narrow space between anode and cathode, a pulsating inlet flow of polluted water, recirculation of processed water (from outlet to inlet of the electrochemical reactor), a static mixer just outside (downstream) the electrochemical reactor, that the water enters through several slanted/inclined channels in the cathode, opposite rotational directions of anode and cathode or a combination of several of these methods. The cathode has a shaft or stud (3) penetrating the anode to facilitate rotation of the cathode. The electrochemical reactor(s) are mounted at the side of the flotation device at the same elevation as the water level. The flotation device is arranged as a tank (14) or a helical system (15), and the device for handling the sludge is a rolling band (23) with adjustable flaps (24) or a phase separator (18) located at the outlet of the helix (15).

12 Claims, 5 Drawing Sheets

WATER PURIFICATION PLANT

BACKGROUND OF THE INVENTION

1. Field of the Invention

This invention concerns a water cleaning system comprising at least one reactor device for electrolytic cleaning of polluted water, one flotation device where the pollutants are separated from the clean water, and one device for handling the sludge. The polluted water enters between at least one anode and one cathode across which a voltage is being supplied such that the anode is being continuously sacrificed when an electric current flows through the electrochemical reactor. From the reactor the water flows into the flotation device where the precipitated pollutants flotate as sludge to subsequently be dealt with in the sludge handling device.

2. Prior Art

One problem with reactor designs of the kind described above is that the anode surface, which may be of aluminum, magnesium or another suitable metal or alloy, gets fouled by pollutants and oxidation products during the electrolysis. This lowers capacity and reduces efficiency. Attempts have been made to solve this problem by rotating the anode (EP-31614), by alternating the polarity on the electrodes (DE-4315117/EP-623558), by having very high pressure on the inflowing water (U.S. Pat No. 4,236,990), by a distance piece between anode and cathode for mechanical scraping the anode clean (SE-470423), or by using a high pressurized liquid for flushing of the anode surface (SE-470554).

Another problem is to obtain sufficiently high separation efficiency without high consumption of anode material and energy. This is attempted solved by having a short distance between the electrodes (NO-143147/FI-55166 and SE-470554) or by mounting the anode within a cylindrical shaped cathode and create powerful agitation or rotation of the water to get a centrifugal effect in addition to the electrical field effect (U.S. Pat No. 5352343).

Even though the problem of anode fouling is partly solved by

SE-470554 and the distance between the electrodes is kept relatively short, which lead to a relatively low power consumption, it is not possible at present to combine high separation efficiency and a low consumption of anode material per cubic meter cleaned water. This leads to higher operating costs, than necessary.

SUMMARY OF THE INVENTION

The basis for this invention is introduction of changes which will improve the electroflocculation process. The objects of the invention are to increase both the separation efficiency and the hydraulic capacity and at the same time reduce consumption of anode material and specific energy consumption per cubic meter. The device can be used to clean produced water and drainage water from oil- and gas platforms, rolling emulsions, tall oil emulsions, water from scrubbers for cleaning of gas etc., where the components to be removed are mineral oil, tall oil, heavy metals and other components which are harmful to the environment. The concentration of these components in the cleaned water shall be well below the limits set by the environmental authorities for discharge of water to a recipient.

These aims can be obtained by a new design of the electrochemical reactor and the associated device by:

Increasing the turbulence of the water in and just after the electrochemical reactor (by using a turbulence generator or by arranging the electrodes in a different way).

Changing the design of the flotation device and the device for removing sludge.

Changing the location of the electrochemical reactor relative to the flotation device.

The water cleaning system in accordance with the invention is characterised by the features mentioned in the requirements shown below and by having the reactor device assembled from one or more anodes and cathodes where the flow of water inside and downstream of the electrochemical reactor is turbulent, a flotation device where the pollutants are separated from the clean water, and a device for handling the sludge.

BRIEF DESCRIPTION OF THE DRAWINGS

The invention is explained in more detail in the text which follows, and the text which shows some examples of operating principles refer to the enclosed drawings.

Turbulence Generators

Arrangements of Anodes and Cathodes.

Figure 7:
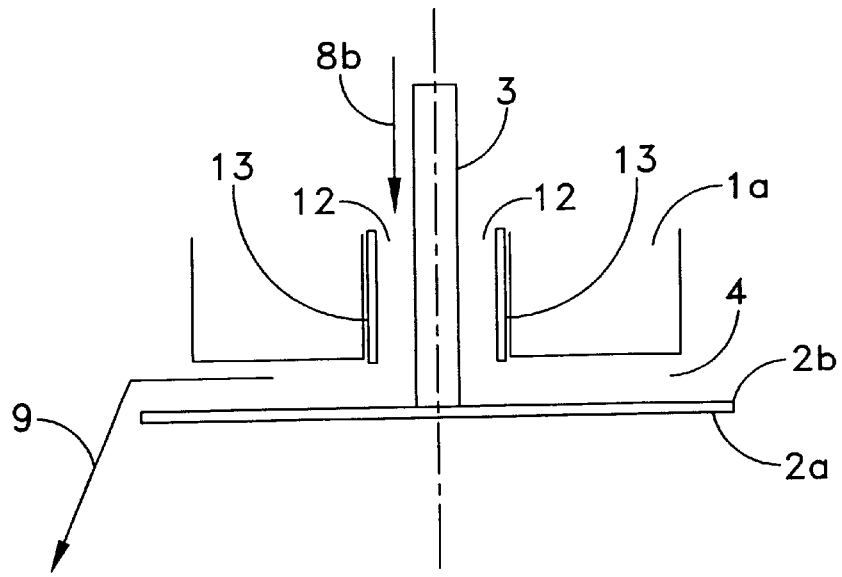

FIG. 7 shows a sideview of an electrochemical reactor where the cathode has a stud running through the anode to allow rotation of both anode and cathode.

Figure 8:
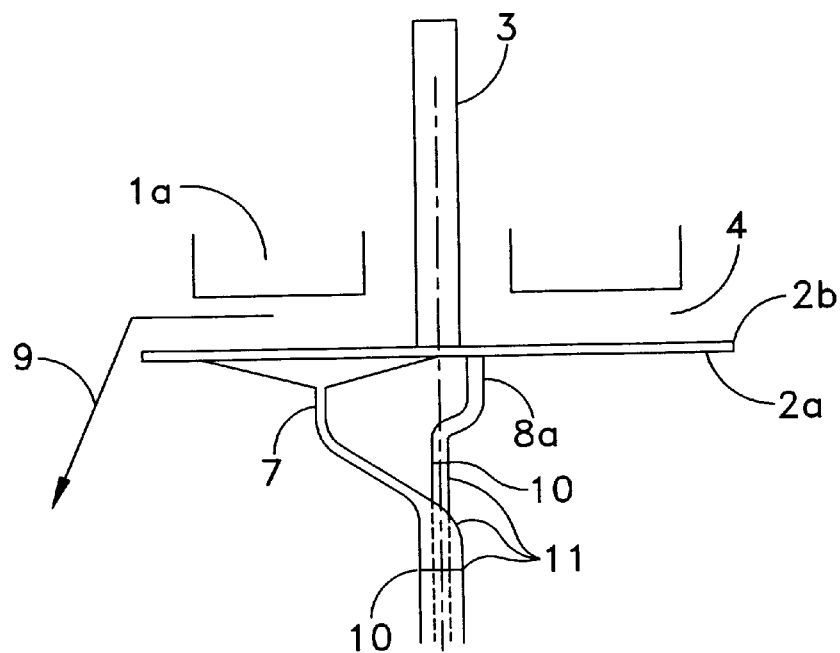

FIG. 8 shows a sideview of the cathode with the water inlet pipes and a high pressure flushing equipment provided with rotating couplings.

Figure 9:
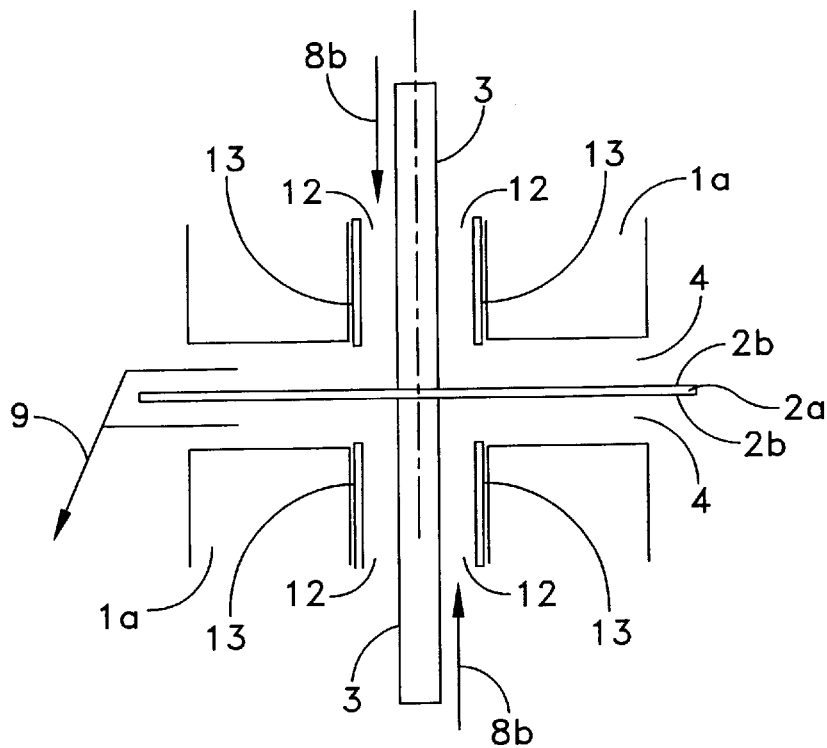

FIG. 9 shows a sideview of a double anode with a cathode in the middle.

Location of the Electrochemical Reactor Relative to the Flotation Device.

Figure 10:
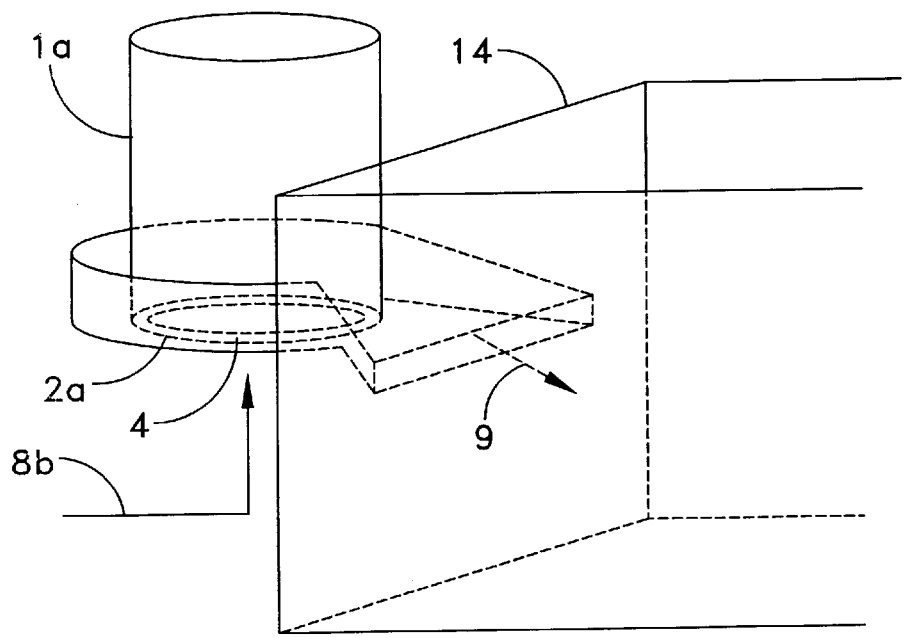

FIG. 10 shows the electrochemical reactor placed outside the flotation device at the same height as the water level.

Flotation Device and off-scraping of Sludge

Figure 11:
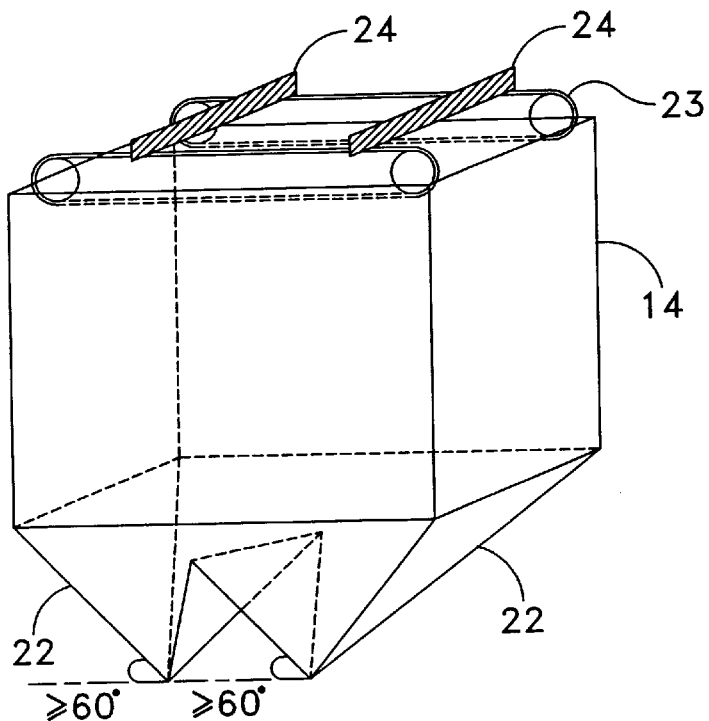

FIG. 11 shows in perspective a sketch of a flotation tank with a roller-band for scraping off sludge.

Figure 12:
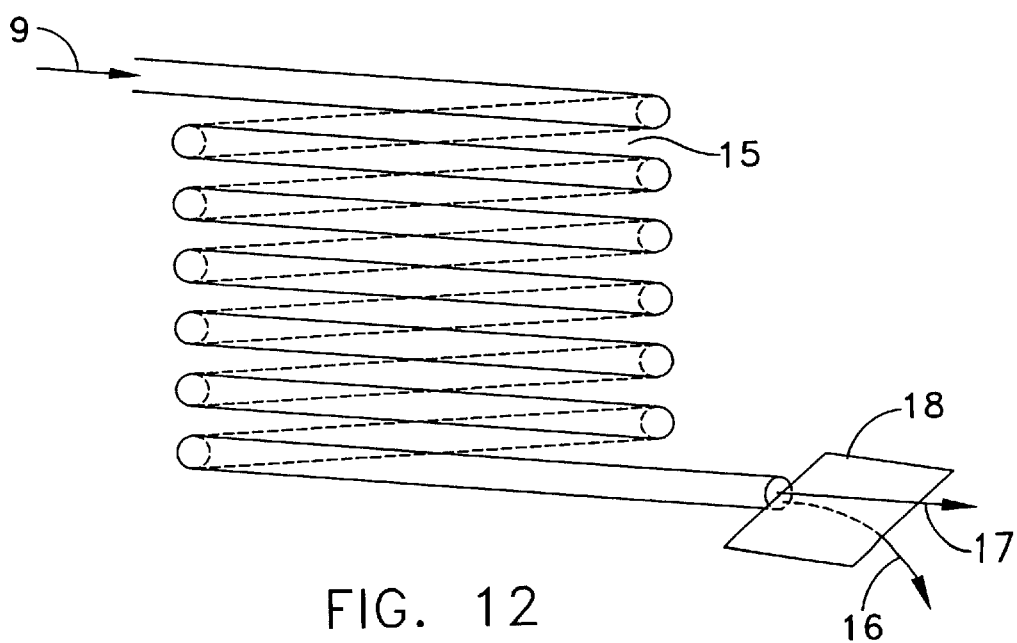

FIG. 12 shows a sideview of a helical system provided with a phase separator at the outlet from the helical system.

The drawings are not everywhere made to the same scale. To simplify the drawings, details that are not required in order to understand the principle are left out.

DETAILED DESCRIPTION OF THE PREFERRED EMBODIMENTS

The water cleaning system according to the invention includes an electrolytic reactor device for cleaning polluted water containing mineral oil, tall oil, heavy metals and other polluting components.

Figure 1:
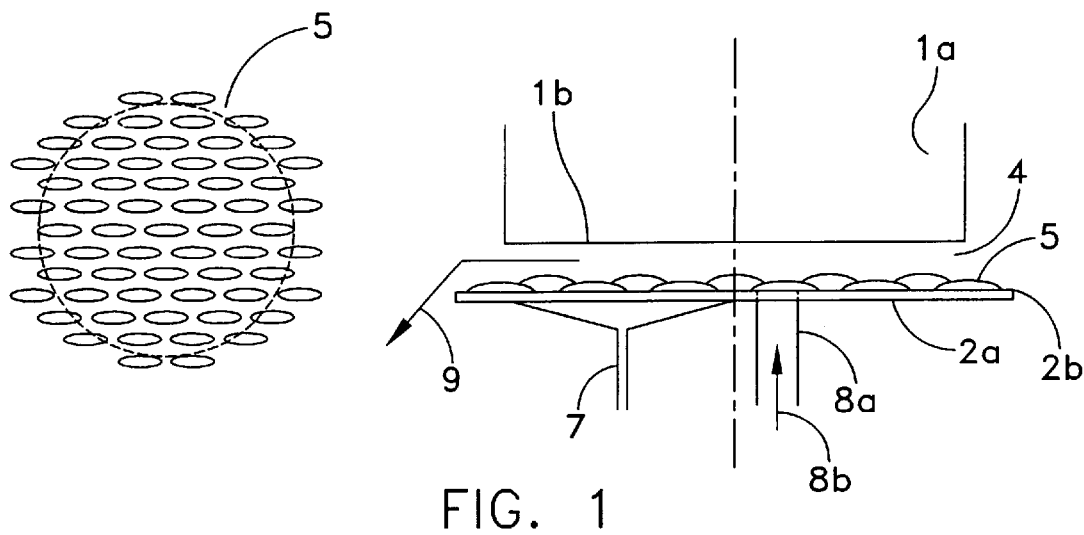
FIG. 1 shows a sketch of a corrugated or rough replaceable/exchangeable inlay plate on the cathode surface.

FIG. 1 shows a cross section of the anode (1a) and cathode (2b) with corrugated inlay plate (5) attached to the cathode surface (2b). The figure also shows a sketch of the inlay plate (5) seen from above, giving an example of how the structure of the inlay plate (5) may be. The inlay plate creates turbulence in the water (8b) which enters the electrochemical reactor (4) such that precipitated aluminum from the anode surface (1b) (in the case when the anode material is aluminum) reacts very fast with the pollutants in the water.

Figure 2:
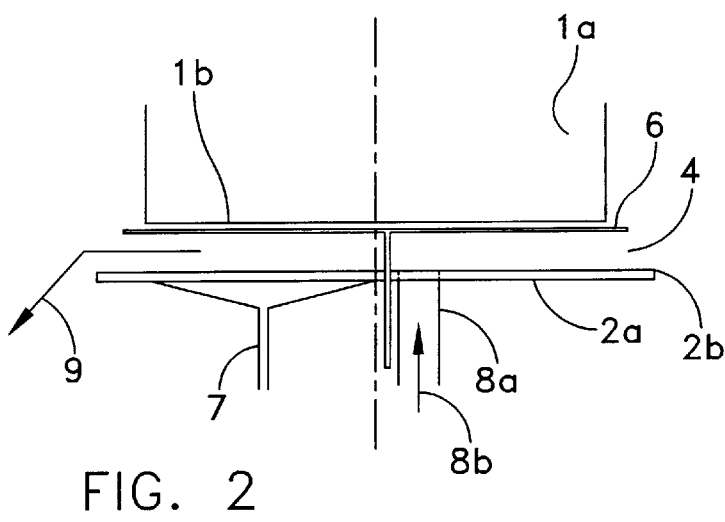
FIG. 2 shows a sketch of a rotatable non-conducting and inert element.

FIG. 2 shows a cross section of the anode (1a) and the cathode (2a) with a rotating inert and non-conducting element (6) inside the electrochemical reactor (4). The rotating element (6) is shaped like a perforated disk such that the pollutants and precipitated aluminum from the anode surface (1b) are not prevented from reacting with each other. The element (6) should be thin, preferably 0.3–0.6 mm, in order not to take up too much of the volume inside the electrochemical reactor (4). For design reasons the element (6) should preferably be circular with a diameter approximately equal to that of the anode (1a). The rotating action of the element creates turbulence in the water, thereby increasing the reaction speed in the reactor (4). The element (6) may be supported close to the center axis of the anode (1a) and the cathode (2a), but not necessarily precisely along the center axis.

Figure 3:
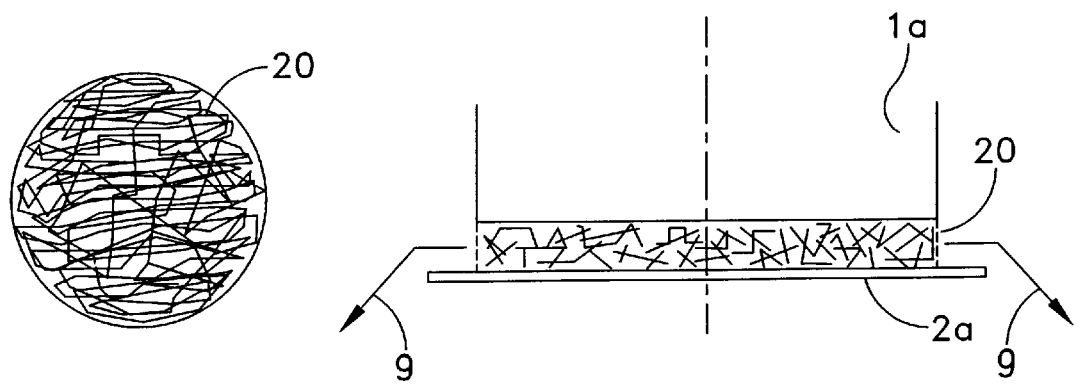
FIG. 3 shows a sketch of a stationary non-conducting and inert element.

FIG. 3 shows a cross section of the electrochemical reactor (4) with a stationary inert and non-conducting part (20). The part (20) causes the water to flow a longer distance through the reactor (4), and the water will therefore be well mixed with the precipitated aluminum (or other material) from the anode surface (1b). The part(20) is also shown viewed from above. The water is here forced to frequently change direction, thus contributing to turbulent flow.

Figure 4:
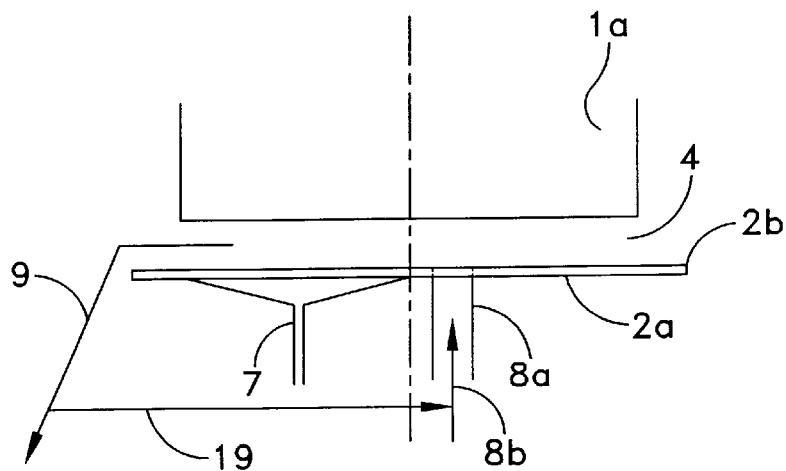
FIG. 4 shows the principle of recirculating the processed water through the electrochemical reactor.

FIG. 4 shows a cross section of the anode (1a) and the cathode (2a) together with a recirculation loop for the processed water (9). The recirculated flow rate may be of the order 1–10 times the flow rate into the process (8b). The recirculation increases the flow through the reactor (4), thereby increasing turbulence and consequently the reaction rate. The amount of consumed aluminum pr. unit volume of incoming water (8b) has not changed compared to the process without recirculation, provided the flow rate is constant, but the separation efficiency will be higher.

Figure 5:
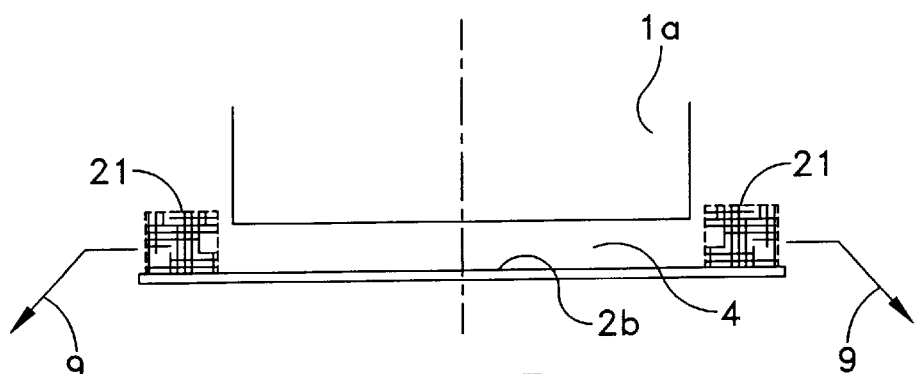
FIG. 5 shows a sketch of a static mixer downstream of the electrochemical reactor.

FIG. 5 shows a cross section of the electrochemical reactor (4) with a static mixer (21) mounted outside the node (1a) on top of the cathode surface (2b), but without being in contact with the anode. The static mixer (21) increases the turbulence just outside the reactor (4) by the intricate flow path imposed on the water stream.

Figure 6:
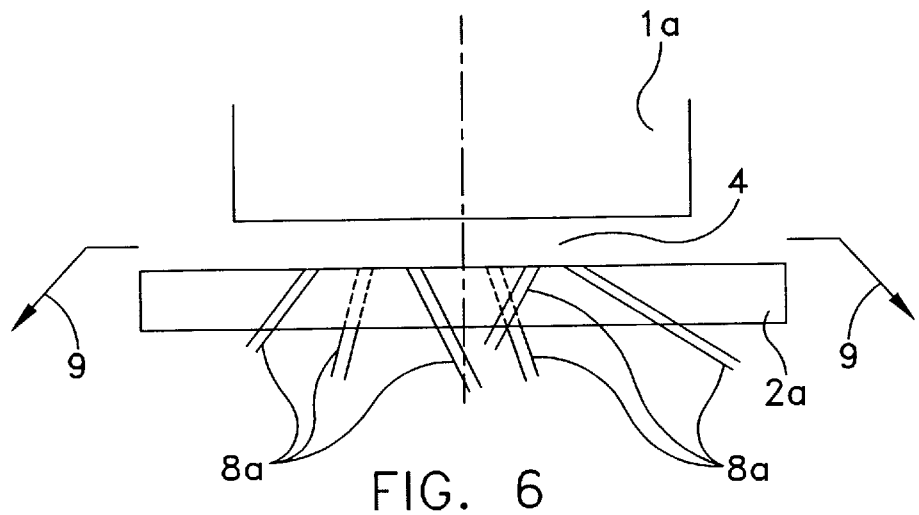
FIG. 6 shows a sketch of the cathode with multiple, slanted/inclined inlets of water to the electrochemical reactor.

FIG. 6 shows a cross section of a cathode (2a) where all or parts of the polluted water flows into the electrochemical reactor (4) through multiple slanted/inclined channels (8a) in the cathode. The channels may have different angles with the horizontal plane.

FIG. 7 shows a cross section of an electrochemical reactor (4) where the cathode (2a) has an axle or stud (3) going through the anode (1a) thereby making it possible to rotate the cathode (2a) by means of a driving mechanism (motor or similar device). The water (8b) flows into the reactor (4) through a channel (12) penetrating the anode (2a) and outside the cathode stud. To prevent electrolysis from taking place in this channel (12) the surface of the anode (1a) inside the channel (12) may be furnished with an isolating layer (13) which end will stay flush with the anode surface (1b) even when the anode material (1a) is being consumed, or the stud (3) may be made of a non-conducting material or may have a non-conducting surface.

FIG. 8 shows a cross section of the electrochemical reactor (4) with inlet pipes for water (8a) and high pressure flushing (7) the rotateable couplings (10). Having rotateable couplings (10) can make the cathode (2a) rotate in the opposite direction of the anode (1a) and thereby contribute to increase the turbulence in the reactor (4). The pipe for the high pressure flushing (7) and incoming water (8a) are arranged such that one pipe runs inside the other pipe a certain distance along the central axis of the electrochemical reactor (4). Both inlet pipes (7,8a) have rotatable couplings located where the pipes run along the central axis of the reactor (4). The pipes (7, 8a) separate such that one or both can be unsymmetrically fastened to the rotating anode (2a), and there is a tight fitting (11) between the pipes (7,8a) where they separate and in the rotateable couplings (10).

FIG. 9 shows a cross section of a dual reactor (4) having two anodes (1a) with a cathode (2a) in the middle. the water flows into the reactor as shown in FIG. 7, the only difference being that the water (8b) is pumped into the lowest reactor (4) from underneath rather than from above. Processed water (9) from the reactors are mixed before being fed to the flotation device.

FIG. 10 shows in perspective a sketch of the anode (1a) and the cathode (2a) located on the outside of the flotation tank (14) such that the processed water (9) from the reactor (4) enters the tank (14) at the same elevation as the water level (14) or just below. When the water from the reactor (4) flows into the tank (14) just below the water level in the tank (14), the flotation rate is faster than with traditional solutions because gas bubbles and the pollutants have a shorter way to travel.

FIG. 11 shows in perspective a sketch of a flotation tank (14) with a volume equal to ⅕ (=20%) of the average hourly flow rate of water. The ratio between the average hourly flow rate and the cross sectional area of water in the tank is about 5 m$^3$/m$^2$h, and the bottom (22) of the tank has the shape of at least one cone. The angle between the walls in the cone and horizontal is about 60°. The device for handling sludge (23) is shaped like a rolling band with one or more adjustable and flexible scrapes or flaps (24). The rolling band (23) operates in the same direction as the flow into the tank.

FIG. 12 shows another sideview of a flotation device having the shape of a helical tube (15). Water (9) from the reactor (4) enters at top of the helix (15) and is slung out towards the walls because of the rotation that takes place when the water flows downwards.

The secondary whirls give a speed profile towards the helical walls (15) such that the water meets a large effective area (9). The clean water (16) and the pollutants (17) emerge as two phases at the outlet of the helix (15) with the water at the bottom. The figure also shows a phase separator (18) at the outlet of the helical system which leads the water (16) and the sludge (17) into different paths. Also in this design will the flotation rate be fast because of short distance to travel for gas bubbles and pollutants.

Increased turbulence in the water just after the electrochemical reactor causes precipitated aluminum and pollutants to mix more efficiently and react with each other into sludge. The chemical reaction in the cell consists of three steps having different reaction speeds.

Precipitation of aluminum from anode to the liquid ($10^{-4}$ sec.).

Diffusion of aluminum/Al-complex and pollutants towards each other (0.5 sec).

Reaction of aluminum/Al-complex and pollutants to form flocs.

If the flow is laminar, step 2 will determine the reaction speed and it is necessary to sacrifice much aluminum or other anode material to make sure that all the pollutants in the water react. The processed water will therefore contain a certain amount of excess aluminum which has not reacted.

By increasing the turbulence it is therefore possible to reduce the consumption of anode material and still increase the separation efficiency. The residence time can also be shortened resulting in an increased hydraulic capacity.

During flotation, however, we strive to obtain as calm flow conditions as possible so that the flocs will not be damaged, but flow unimpeded to the surface by means of the hydrogen gas being formed at the cathode. By mounting the cell as shown in FIG. 10, the hydraulic capacity can also be increased because of faster flotation and reduced residence time in the flotation device.

If the flotation device is in the shape of a tank the values for volume, cross sectional area and sinking speed of the water have to be optimised. Large cross sectional area and large tank volume results in long residence time and good flotation, but has high space requirements. With high sinking water velocity the tank volume can be made smaller, but a drag effect will tend to pull sludge down from the surface. The optimum values are a tank volume of ⅕ of the average hourly flow of water and a water sinking velocity (ratio between volumetric flow rate and cross sectional area) of 5 $m^3m^2h$. If the volumetric flow rate is $1m^3/h$, the tank volume will be 200 litres and the cross sectional area 0.2 m. The cone should have an angle of at least 60° with the horizontal so that heavy sludge-can sink to the bottom and be removed. The sludge scraping device should operate in the direction of the inlet water flow to get as calm conditions in the tank as possible.

By using a helix as a flotation device rather than a tank, the space requirements can be reduced. Water is drawn against the wall of the helical tube because of the rotational flow. Secondary whirls give a speed profile towards the wall so that the effective surface becomes large, and this makes the two phases, water and sludge, to separate fast and the residence time can be reduced. The helix also gives increased separation at low speed gradients. At the outlet of the helix the sludge will lay at the top and the clean water at the bottom, and by using a "knife" adjusted to the correct height, it is possible to separate the to phases two different tanks.

EXAMPLE

Table 1 shows results from experiments with and without a turbulence generator. The experiments were done with a prototype from SE-470551 with and without a corrugated inlay plate on the cathode. The water used for the experiments was so-called ejector water from tall oil production containing monoterpenes, sesquterpenes, diterpenes, fatty acids, resin acid and Na-sulfate. This emulsion is very stable and difficult to separate. The consumption of anode material pr. $m^3$ water is therefore much higher than what is normal for separating other emulsions. The content of pollutants is measured as turbidity (FTU) and chemical oxygen consume (KOF)(mg/l).

TABLE 1

Experiments on ejector water from tall oil production with and without a turbulence generator

| Date | No | Plate | Vol. flow $m^2/h$ | Voltage V | Current A | Energy consumption k $Wh/m^2$ | Dosage g $Al/m^1$ | Inlet FTU | Turbidity Outlet creduction % | KOF In. mg/l | KOF Red. % |
|---|---|---|---|---|---|---|---|---|---|---|---|
| 17/10-95 | 1 | no | 0.50 | 25 | 210 | 10.5 | 141 | 270 | 47,4 | 7273 | 16,0 |
| 20/10-95 | JE2 | yes | 0.57 | 35 | 253 | 15.5 | 149 | 296 | 74,3 | — | — |

(—: values which are not measured)

The table shows that the separation efficiency increases dramatically (from 47.4% to 74.3%) by using the corrugated inlay plate when consumption of anode material and other parameters are kept at approximately the same level. This shows the importance of good mixing in the electrochemical reactor to avoid excessive use of anode material and therefor higher operating costs to ensure a high degree of separation.

The invention can be modified and changed in different ways. In particular it must be pointed out that one or more of above mentioned characteristics can be combined.

One or both electrodes may be rotatably mounted, and the constructional materials may be quite freely selected if only the constructional strength is sufficient high.

What is claimed is:

1. Water cleaning device comprising at least one reactor device for electrolytic cleaning of polluted water, a flotation device for separating pollutants from the polluted water and a device for handling sludge, wherein the reactor device has a reaction area and at least one substantially horizontal anode and a cathode parallel thereto located upstream of the flotation device along a flow, having at least one separate turbulence generator for affecting a flow pattern of the water causing the water to flow in a turbulent manner inside the reaction area and in an area immediately thereafter along the flow.

2. Water cleaning device according to claim 1, wherein the turbulence generator comprises at least one of a corrugated and rough, exchangeable inlay plate on a surface of the cathode.

3. Water cleaning device according to claim 1, wherein the turbulence generator comprises a non-conducting, rotatable piece in the reactor device.

4. Water cleaning device according to claim 1, wherein the turbulence generator comprises an inert, non-conducting, stationary piece in a narrow space between the anode and cathode.

5. Water cleaning device according to claim 1, wherein the turbulence generator comprises a static mixer just outside the reaction area.

6. Water cleaning device according to claim 1 comprising a means for recirculating water from an outlet to an inlet of the reactor device in at least one of a controlled and pulsating manner.

7. Water cleaning device according to claim 1, comprising a dual anode with a cathode in the middle.

8. Water cleaning device according to claim 1, comprising a single reactor device, arranged alongside the flotation device at a same elevation as a water level within the flotation device, such that the water has a short distance to travel from the reactor device to the flotation device.

9. Water cleaning device according to claim 1, further comprising a helical pipe system and wherein rotation of polluted water within the helical pipe system separates the polluted water into two phases.

10. Water cleaning device according to claim 9, wherein the device for handling sludge is equipped with a phase separator located at an outlet of the helical system.

11. Water cleaning device according to claim 1, comprising at least two reactor devices, wherein each reactor device is arranged alongside the flotation device at a same elevation as a water level within the floatation device, such that the water has a short distance to travel from the reactor device to the flotation device.

12. Water cleaning device according to claim 1, comprising at least two reactor devices arranged within the floatation device, wherein at least one of the reactor devices is submerged in water within the floatation device, such that the water has a short distance to travel from the reactor device to the flotation device.

* * * * *